July 13, 1948.  A. H. MAYNARD  2,445,179
FASTENER-APPLYING IMPLEMENT

Original Filed Dec. 8, 1944  3 Sheets-Sheet 1

Inventor:
Arthur H. Maynard
By Jennings and White
Attorneys.

July 13, 1948.  A. H. MAYNARD  2,445,179
FASTENER-APPLYING IMPLEMENT
Original Filed Dec. 8, 1944  3 Sheets-Sheet 2

Inventor:
Arthur H. Maynard
By  Attorneys.

July 13, 1948.     A. H. MAYNARD     2,445,179

FASTENER-APPLYING IMPLEMENT

Original Filed Dec. 8, 1944     3 Sheets-Sheet 3

Inventor:
Arthur H. Maynard
By Pennington and White
Attorneys

Patented July 13, 1948

2,445,179

UNITED STATES PATENT OFFICE 2,445,179

FASTENER-APPLYING IMPLEMENT

Arthur H. Maynard, Warwick, R. I., assignor to Boston Wire Stitcher Company, Warwick, R. I., a corporation of Maine Original application December 8, 1944, Serial No. 567,221. Divided and this application February 2, 1946, Serial No. 645,040

12 Claims. (Cl. 1—3)

This application is a division of application Serial No. 567,221, filed December 8, 1944.

This invention relates to fastener-applying implements for attaching papers and other sheets, and fastening labels, tags and other articles to various objects.

One object of the invention is to provide a fastener-applying implement which is convertible for driving staples through papers and other sheets and clinching their legs against the under side thereof, or for use as a tacker to drive staples into the work without clinching their legs to fasten tags and the like to other objects.

Another object is to provide an implement of the type indicated in which the stample-driving mechanism may be used with clinching means for clinching the legs of the staples on the under side of the work or adjusted for use in driving the staples without the use of the clinching means to tack articles to other objects.

Another object is to provide an implement of the type indicated having a base provided with clinching means, a magazine-arm for containing a supply of staples pivoted above the base, a staple-driver operative by a lever hinged to the magazine-arm, and means for adjusting the device with the staple-driver in cooperative relation to the clinching means or with a displacement therebetween to provide for operating the staple-driver independently of the clinching means.

Another object is to provide an implement of the type indicated in which the staple-driving means is shiftable beyond the range of the clinching means;

Further objects of the invention are to provide an implement of the type indicated of simple construction and capable of being readily adjusted for different types of work by simply shifting one part in relation to another without manipulating screws, nuts or other mechanical elements.

The invention is described in the following specification as embodied in several different forms of construction illustrated by the accompanying drawings, in which.

Figure 1:
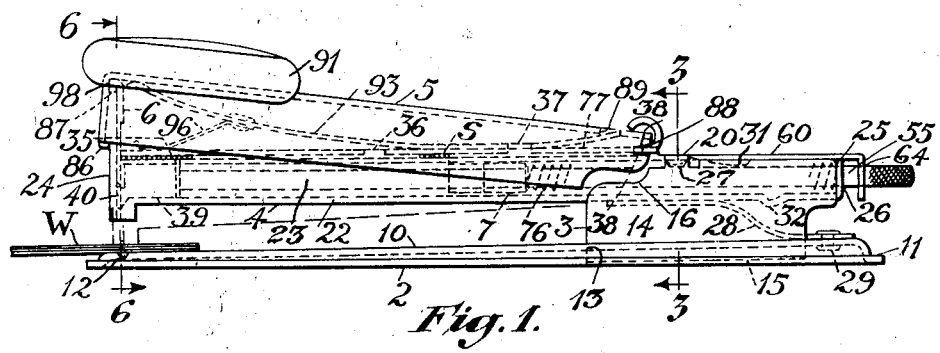
Fig. 1 is a side elevational view of one form of construction of the implement shown as adjusted for attaching papers or the like by driving staples therethrough and clinching their legs on the under side thereof.

Fastener-applying or stapling implements as now most generally used comprise two distinct types; first, implements for driving the staples through the work and clinching their legs on the under side thereof; and secondly, hammer-type implements and tackers for driving staples through the work to tack or fasten articles to various objects without clinching the legs of the staples. In some instances, implements of the present class have been made to serve both purposes, usually by providing clinching means on the base of the implement and arranging the base to be swung rearwardly to displace the clinching means from cooperative relation to the staple-driving means so that the latter may be used to drive the staples without clinching their legs during a tacking operation. In this latter type of implement, however, the base must be swung back to extend rearwardly to a considerable extent so that it forms an impediment to convenient use of the implement, that is, renders it inconvenient and awkward to operate as a tacker. To overcome this defect or deficiency in implements of the type heretofore in use, the present invention provides an improved device in which the staple-driving means may be shifted forwardly of the base clear of the clinching means to adapt the implement for operation as a tacker. In brief, the present invention provides a fastener-applying implement which is readily convertible for use either for driving and clinching the staples or for driving them into the work without clinching their legs in a tacking operation by shifting the staple-driving means relatively to the clinching means in fore-and-aft direction.

Referring to the present drawings, in one preferred form of construction of the invention the implement comprises the usual base having clincher-grooves at its forward end, a magazine-arm pivoted above the base and adapted to contain a supply of staples, a lever pivoted to the magazine-arm, and a staple-driver mounted on the lever for reciprocation through a throat in the magazine-arm to drive staples into the work in alinement with the clinching means. In this particular form of the invention, the stapling arm and the staple-driving means, including a manually operable lever, are mounted for relative longitudinal displacement with respect to the base to adjust the stapling means either in alinement with the clinching means or in advance thereof clear of the base to adapt the implement for a tacking operation. In general, the construction of the implement is similar to that described and illustrated in a copending application for United States Patent Serial No. 563,499, filed November 15, 1944, granted as U. S. Letters Patent No. 2,420,830 on May 20, 1947, comprising a relatively flat base 2, a mounting 3 rising from the rearward portion of the base, a magazine-arm 4 adapted for pivotal connection to the mounting in adjustable position longitudinally of the base, a lever 5 pivoted to the arm 4, a staple-driver 6 mounted on said lever and reciprocable through a throat at the forward end of the arm 4, and staple-feeding means 7 within the magazine-arm 4 for advancing the staples into position beneath the staple-driver. The base 2 may be constructed of sheet-metal with a raised platform 10 surmounting a marginal flange 11 adapted to rest upon a desk or other support. Preferably, the top plate or platform 10 of the base 2 is inclined downwardly from the rear to the front to adapt it to more nearly aline with the magazine-arm 4 when the latter is depressed against the work as indicated by dash-lines in Fig. 1. By this sloping or inclined construction the height of the clinching means is reduced so that when the magazine-arm is shifted forwardly to locate the staple-driver beyond the end of the base 2, its inclination to the work will not be as great as if the clinching means were elevated a considerable distance at the front of the base. At the same time, the greater height of the rearward portion of the base provides the necessary clearance for attaching the mounting 3, comprising a pair of standards 14 for pivotally supporting the arm 4 as will be observed more clearly from the following description. At its forward end the platform 10 of the base 2 is provided with indentations forming clincher-grooves 12 of usual contour. At its rearward end the platform 10 of the base 2 is provided with opposite parallel slots 13 for a purpose explained later.

Figure 3:
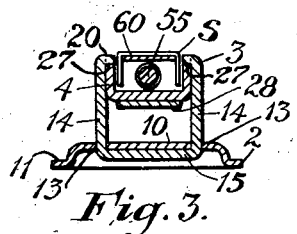
Fig. 3 is a transverse sectional view on line 3—3 of Fig. 1.

The mounting 3 is preferably constructed of sheet-metal in channel shape with parallel side walls 14 connected by a bottom wall or floor 15. The mounting 3 is attached to the base 2 by inserting its side walls 14 upwardly through the slots 13 and welding or otherwise fastening its bottom wall 15 to the under side of the platform 10 of the base, see Fig. 3. The side walls 14 of the mounting 3 provide parallel standards and preferably their forward and upper edges are shaped with reverse curves as indicated at 16. Rearwardly of the curved portions of the two walls or standards 14 a pair of lugs 20 project upwardly therefrom and are bent inwardly at substantially right-angles with their under sides rounded at 21. The two lugs 20 serve as pivots for mounting the magazine-arm 4 on the standards 14.

Figure 4:
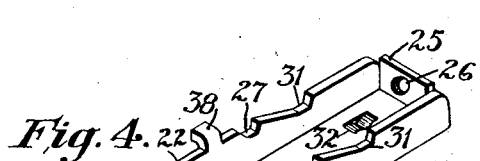
Fig. 4 is a perspective view of the magazine-arm for this type of implement.
Figure 5:
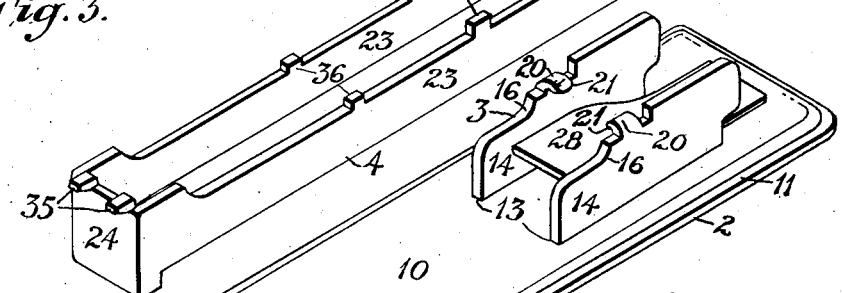
Fig. 5 is a perspective view of the base of the implement showing the standards for pivoting the magazine-arm thereon.
Figure 6:
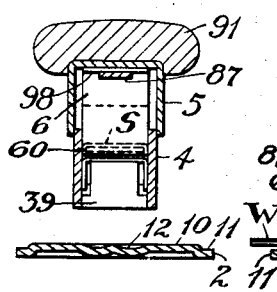
Fig. 6 is a vertical sectional view on line 6—6 of Fig. 1 showing the magazine-arm and staple-driver lever in raised position.
Figure 7:
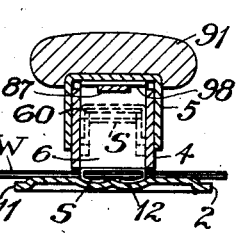
Fig. 7 is a similar view showing the arm and lever depressed and illustrating the staple-driver in position at the completion of the driving and clinching of a staple.
Figure 8:
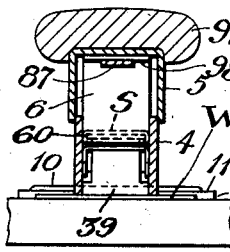
Fig. 8 is a sectional view on line 8—8 of Fig. 2 showing the magazine-arm adjusted to bear directly against the work independently of the clinching means and illustrating the staple-driver lever as raised.

Referring to Fig. 4, the magazine-arm 4 is preferably constructed of sheet-metal in channel shape with a bottom wall 22 and side walls 23 rising therefrom. Its forward end is closed by a transverse wall 24 and its rearward end by an upwardly-bent extension of the bottom wall 22 forming a vertical wall 25 provided with a central hole 26. Adjacent its rearward end the upper portions of the side walls 23 are cut away to form tapered notches 27 adapted to engage with the rounded faces 21 of the inwardly-bent lugs 20 on the standards 14 to pivotally mount the arm 4 between the standards. As a novel feature of the present invention, the arm 4 is provided further with bearing means for mounting it in forward position on the base 2 by manually adjusting it on its mounting 3. For this purpose the side walls 23 of the arm 4 are formed with additional notches 31 located rearwardly of the notches 27, the rearward sides of these notches being slightly inclined with a relatively abrupt face, whereas the forward sides of the notches are inclined much less steeply to connect with the rearward sides of the notches 27. The purpose of this form of construction will appear later in the explanation of the method of operation of the device. Spaced along the sides 23 of the arm 4 are pairs of lugs 36 and 37 and between the lugs 37 and the notches 27 is a pair of lugs 38 bent outwardly at substantially right-angles to provide pivots for mounting the staple-driving lever 5 on the arm.

At the rearward end of the arm 4 its bottom wall 22 is sheared to provide a narrow strip of the metal forced downwardly to form a substantially V-shaped projection 32 having an abrupt forward portion and a sloping rearward inclination. A substantially S-shaped spring 28 is fastened to the rearward end of the base 2 by means of a rivet 29 with its forward end engaging under the arm 4. The spring 28 acts to maintain the arm 4 raised above the base with either pair of the notches 27 or 31 in engagement with the pivot-lugs 20 on the standards 14. When the arm 4 is shifted into forward position, as shown in Fig. 2, the projection 32 on the bottom of the arm will ride up on the curved portion of the spring 28 and thereby tend to rock the forward end of the arm downwardly in the manner explained more fully hereinafter. Normally, the spring 28 acts to sustain the arm 4 in substantially horizontal position as shown in Fig. 1 while resisting its rocking motion as its forward end is depressed against the work to the position indicated by the dash-lines in Fig. 1.

Figure 2:
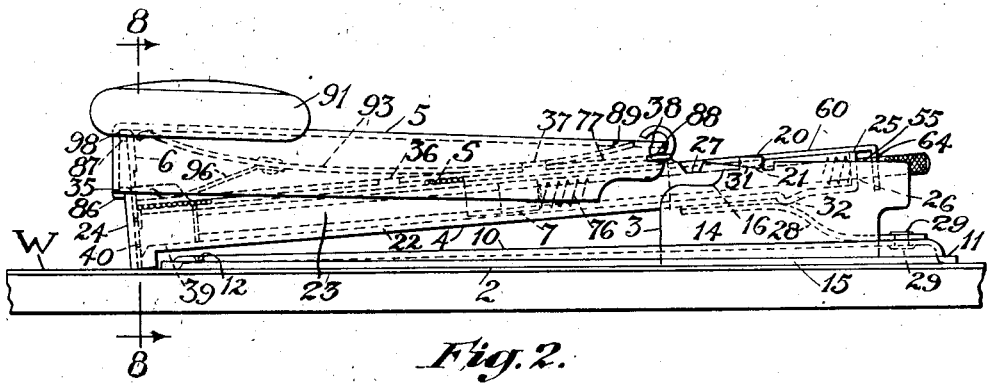
Fig. 2 is a similar view of the implement shown as adjusted for use as a tacker for attaching tags, labels and the like to other objects by driving the staples into the work without clinching their legs.

Seated within the magazine-arm 4 at its forward end is a rectangular block 39 arranged with its forward face spaced from the front wall 24 of the arm to provide a relatively narrow throat 40 therebetween through which the staples are driven, see dotted lines in Figs. 1 and 2. Seated on the top of the block 39 and extending longitudinally of the arm 4 in spaced relation to the side walls 23 is a relatively flat plate-like rest 60 for supporting the staples s in straddled relation thereon to adapt them to feed forwardly to the staple-driver 6. The rearward end of the rest 60 seats on the edge of the end wall 25 of the arm 4 and is provided with a hole 64 in alinement with the hole 26. A rod 55 extends longitudinally within the arm 4 with its rearward end slidable in the holes 26 and 64. Mounted to slide on the rod 55 is the staple-pusher 7 adapted to engage the rearmost staple in a series supported in straddled relation on the rest 60. A helical spring 76 coiled about the rod 55 and arranged with its rearward end bearing against the rearward end wall 25 acts against the pusher 7 to slide it forwardly for feeding the staples s beneath the staple-driver 6; these elements of the implement being shown and described more in detail in the copending application referred to above.

Seated on top of the sides 23 of the arm 4 is a cover-plate or guard 77 elevated above the staple-rest 60 to provide a space for the staples to slide therein. The guard 77 is held longitudinally by means of the pairs of lugs 36 and 37 on the sides of the arm 4 which project through slots in the sides of the rest. A supply of staples held together in a strip or "stick" may be inserted under the rearward end of the guard 77 and slid along the rest 60 into position to be fed forwardly by the staple-pusher 7 in the manner explained more particularly in the copending application referred to above.

The staples s are driven through the throat 40 at the forward end of the arm 4 by means of the driver 6 which is mounted on the lever 5 for reciprocation thereby. The lever 5 is of inverted trough-shape arranged with its sides straddling the sides of the arm 4 and its rearward end pivoted on the outwardly-projecting lugs 38 on the arm. For this purpose the sides of the lever 5 are formed with V-shaped notches 88 at their ends adapted to engage the lugs 38 to provide a pivotal connection between the lever and arm. The lever 5 normally is maintained in raised position with respect to the arm 4 by means of an arcuate spring 93 having its forward end bearing against the upper wall of the lever and its rearward end engaging against the rearward edge of a slot 89 in the lever. The spring 93 has slots in its edges engaged by the upstanding lugs 37 on the sides of the arm 4 to retain the spring in position with its rearward end acting against the edge of the slot 89 to maintain the engagement between its bearing notches 88 and the pivot-lugs 38. Fastened to the forward end of the spring 93 is a lighter spring-blade 96 which bears against the forward end of the cover or guard 77 and together with the rearward portion of the spring 93 serve to hold the guard seated on the side walls of the arm 4. At the forward end of the lever 5 is a hand-rest 91 constructed of Bakelite or other suitable plastic material and formed with a crowned top for receiving the pressure of the hand during the operation of the lever. The staple-driver 6 is held within the confines of the throat 40, being mounted by means of a projection 98 at its upper end hooked over an inwardly-directed projection 87 on the forward wall of the lever. The lever 5 is limited in its upward movement under the tension of the springs 93 and 96 by means of a pair of lugs 86 engageable with detent-lugs 35 projecting forwardly from the end of the arm 4, see Fig. 4.

While the implement is described and shown in the present drawings as of certain construction, it is to be understood that the invention is not limited as to the details of the main elements of the device; that is to say, the magazine-arm, staple-driving means and other operating parts may take various other forms as well known to those versed in the art. The improved feature of adjustment for adapting the implement for use either for stitching articles together with a clinched staple or for tacking articles to other objects may be applied to use with other forms of construction of the implement besides that herein described and illustrated.

In the form of construction of the implement described above and illustrated in Figs. 1 to 9, inclusive, the adjustable means are embodied in the pivot mounting for the arm 4. The method of operation of this form of the implement is as next explained. With the magazine-arm 4 mounted above the base 2 by means of the pivot-lugs 20 engaging in the forward pair of notches 27 and the spring 28 maintaining this connection between the parts, the implement is adjusted for stitching or stapling with clinched staples. The staples s are fed forwardly in the magazine-arm 4 by means of the staple-pusher 7 advanced by the spring 76 and are driven through the work by means of the reciprocable driver 6 actuated by the lever 5. Pressure on the hand-rest 91 will cause the lever 5 to act through the spring 93 to force the arm 4 downwardly into the position indicated by dash-lines in Fig. 1 to engage its forward end with the work, represented at W as overlying the base 2. As the arm 4 contacts against the work the springs 93 and 96 will yield to cause the lever 5 to be depressed with respect to the arm 4 to slide the driver 6 downwardly in the throat 40 and drive a staple through the work W. As the staple s is driven in this manner its legs will engage the clincher-grooves 12 and be bent over toward each other and clinched on the other side of the work in the usual manner as well known to those versed in the art. The implement may be operated continuously in this manner to apply staples to the work and clinch them on the under side thereof in the form of stitches providing a firm fastening therefor.

Figure 9:
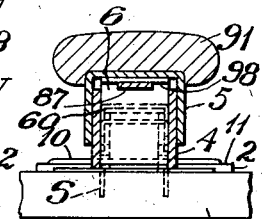
Fig. 9 is a similar sectional view showing the lever depressed and the staple-driver in position at the completion of driving a staple into the work without clinching its legs.

When it is desired to use the implement as a tacker for driving staples to attach tags, labels, or the like to other articles, to fasten window-shades to rollers, tack carpet or rugs to floors or for other similar purposes, the parts are adjusted to the position shown in Fig. 2 of the present drawings. That is, the arm 4 is shifted forwardly on the standards 14 to such an extent as to adapt the lugs 20 to engage in the rearward pair of notches 31. This adjustment may be made by simply pressing down on the rearward end of the arm 4 against the tension of the spring 28 to release the notches 27 from the lugs 20 and then sliding the arm forwardly with the projection 32 on its under side riding up on the curved surface of the spring. The lugs 20 thus will be caused to engage in the notches 31 to provide a pivotal connection between the arm and the standards 14 of the mounting 3 with the forward end of the arm 4 located in advance or beyond the end of the base 2. With this adjustment of the implement the lever 5 is operated in the manner explained above to first cause the forward end of the arm 4 to contact against the work and to thereafter slide the staple-driver 6 downwardly in the throat 40 to drive a staple into the work W as shown in Fig. 9. When it is required to reconvert the implement for stitching with clinched staples the procedure of adjustment is reversed, that is, the rearward end of the arm 4 is pressed downwardly and the arm shifted rearwardly along the standards 14 to bring the notches 27 in alinement with the lugs 20, whereafter the spring effects engagement therebetween to pivotally support the arm 4 in the position shown in Fig. 1.

Figs. 10 to 15, inclusive, of the drawings, illustrate a modification in the construction of the implement whereof the stapling mechanism is adapted for adjustment longitudinally of the base 2. In this embodiment of the invention, however, instead of shifting the arm 4 on its standard the standard itself is adapted to be adjusted forwardly and rearwardly on the base 2. In this type of implement the magazine-arm 4, the staple-driver 6 and the other essential operating elements of the device are illustrated as of the same construction and arrangement as in the embodiments described above, although they may vary therefrom in other adaptations of the present invention.

The base 2 is of substantially the same form and construction as that shown in Figs. 1, 2 and 4 except that the parallel slots 65 are extended forwardly to adapt the sides or standards of the mounting for the arm 4 to slide therein. Midway of the length of the slots 65, openings 66 are cut through the upper platform 10 of the base 2 and forwardly thereof the sheet-metal is punched or stamped to form raised portions 67 concaved on their under sides to provide arcuate bearing pockets 68. The forward end of the base 2 is provided with clincher-grooves 12 similar to those in the base of the implement illustrated in Figs. 1 to 5 and at its rearward end the same form of spring 28 is fastened to the base by means of a rivet 29.

Figure 12:
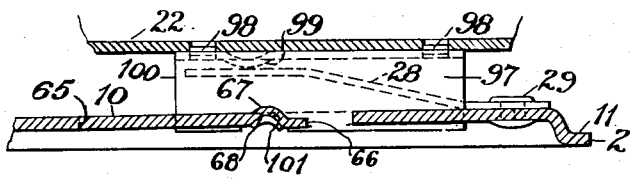
Fig. 12 is a longitudinal sectional view through the rear portion of the base of the implement illustrating the adjustable means for mounting the magazine-arm and stapling mechanism in either forward or rearward position thereon.
Figure 13:
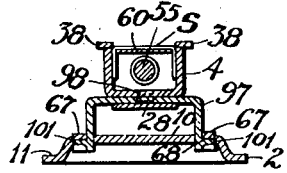
Fig. 13 is a vertical sectional view on line 13—13 of Fig. 10.
Figure 14:
Fig. 14 is a perspective view of the magazine-arm for the last-described form of construction of the implement.
Figure 15:
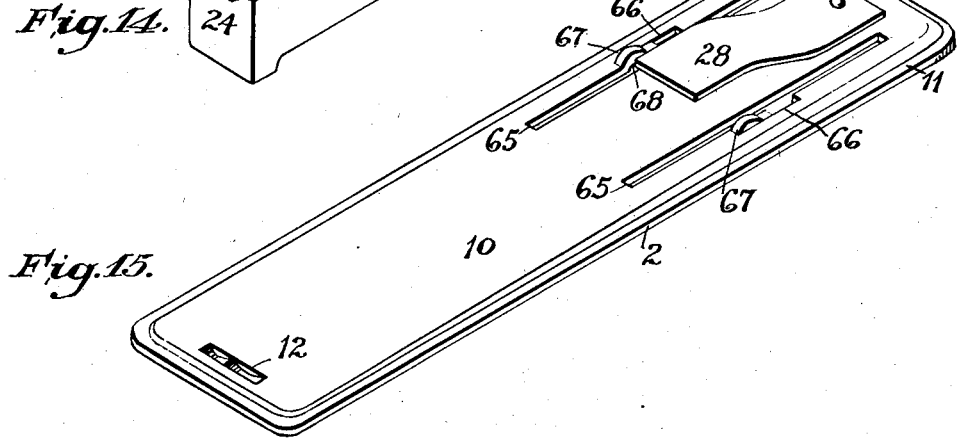
Fig. 15 is a perspective view of the base for this latter type of implement.

Fastened on the under side of the magazine-arm 4 at its rearward end is a support or mounting 97 of inverted channel-shape secured to the bottom wall 22 of the arm by welding or other suitable means. A protuberance 99 formed on the under side of the top wall of the mounting 97 by indenting the metal on top is designed for a purpose later explained. As shown in Fig. 12, a pair of circular lugs 98 are struck up or punched from the metal of the top wall of the mounting 97 to project thereabove into holes in the bottom wall 22 of the arm 4 to locate the mounting in position on the arm. The side walls 100 of the mounting 97 are adapted to slide in the slots 65 in the base 2 and are formed with outwardly-projecting trunnions 101 struck up from the metal and shaped with a curvature corresponding to that of the concaved pockets 68 on the base.

To mount the magazine-arm on the base 2, the side walls 100 of the mounting 97 are inserted down through the slots 65 in the base by passing the trunnions 101 through the lateral openings 66. The mounting 97 then may be slid forwardly to engage the trunnions 101 in the bearing pockets 68, see Figs. 12 and 13. During this connection of the parts the rounded protuberance 99 on the under side of the arm 4 will slide along the top of the spring 28, which is depressed as the trunnions 101 are seated in the bearing pockets 68, whereby to cause the spring to maintain the arm in elevated position on the base 2 while adapting it to pivot with the trunnions rocking in the bearing pockets.

Figure 10:
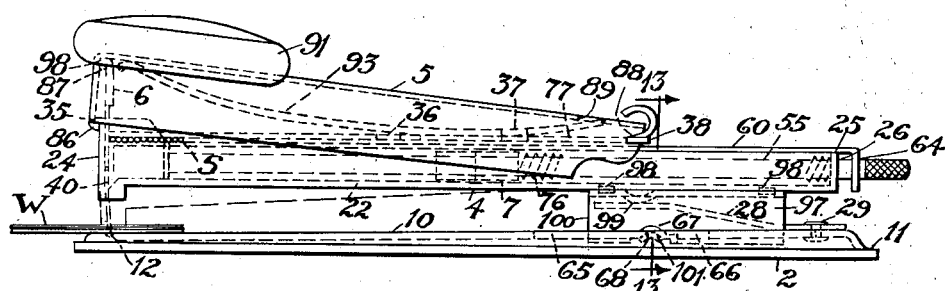
Fig. 10 is a side elevational view of a modified form of the implement showing its parts adjusted for driving and clinching the staples in the work.

With this last form of construction of the implement, when the trunnions 101 are seated in the bearing pockets 68 the arm 4 will be mounted on the base 2 in the relationship shown in Fig. 10, that is with the staple-driver 6 in alinement with the clincher-grooves 12 on the base. It then may be operated in the usual manner to drive staples through the work W and clinch their legs on the under side thereof to attach together papers or other sheets and the like.

Figure 11:
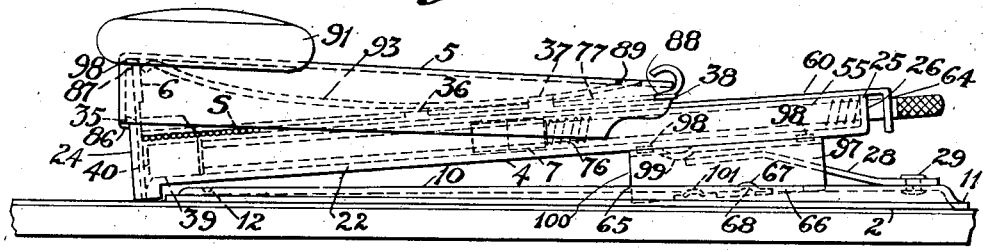
Fig. 11 is a similar view showing this type of implement with its magazine-arm and staple-driving means adjusted to forward position for driving staples for a tacking operation.

When it is desired to employ the implement as a tacker the arm 4 may be shifted forwardly with the sides 100 of the mounting 97 sliding in the slots 65 in the base 2. During this forward adjustment of the arm 4 the protuberance 99 on its under side will slide forwardly along the top of the spring 28 to overhang its end as shown in Fig. 11 and at this juncture the spring will tend to tilt the arm 4 downwardly since its moment of force will be directed rearwardly of the pivotal axis of the arm. The arm 4 and the staple-driving means mounted thereon may thus be adjusted to a position to locate the staple-driver in advance of the end of the base 2 so that the staples s may be driven into the work independently of and without the cooperation of the clincher-grooves whereby to render the implement operative as a tacker. During the operation of the implement in the manner last explained, the trunnions 101 bear against the under side of the platform portion 10 of the base 2 to rock thereon as the forward end of the arm 4 is carried down against the work. In this last described relationship of the parts the lever 5 may be operated continuously to drive a series of staples as the base 2 of the implement is shifted either laterally or longitudinally of the work.

It will be observed from the foregoing specification that the present invention provides an improved type of implement capable of being converted to drive and clinch staples for stitching together papers and other articles or for driving the staples without clinching their legs to adapt it to be used as a tacker for fastening tags, labels and the like to other objects. The implement is readily convertible to its different uses by merely shifting or adjusting certain of the parts without manipulating or removing any nuts, screws, pins or the like and without requiring the use of tools.

While the implement is herein shown and described as embodied in several preferred forms of construction, it is to be understood that various modifications may be made in the form and arrangement of its parts and that the particular features of adjustment may be applied to other types of fastener-applying implements besides that herein particularly described. Therefore, without limiting myself in this respect, I claim:

1. A fastener-applying implement comprising a base, clinching means at the forward end of the base, an arm pivoted at the rearward end of the base, staple-driving means carried by the arm, and means for adjusting the arm longitudinally of the base to position the staple-driving means in cooperative relation to the clinching means or to displace the staple-driving means forwardly beyond the end of the base to position it out of range of said clinching means.

2. A fastener-applying implement comprising a base, clinching means at the forward end of the base, a magazine-arm for containing staples, means for pivotally mounting the arm on the base to adapt it to be shifted longitudinally thereof, and staple-driving means at the forward end of the arm adapted to cooperate with the clinching means in one position of the arm and to operate out of range of the clinching means when the arm is shifted forwardly to position the staple-driving means beyond the end of the base.

3. A fastener-applying implement comprising a base, clinching means at the forward end of the base, a standard at the rearward end of the base, an arm, means for pivotally mounting the arm on the standard at different points therealong for adjustment longitudinally of the base, and staple-driving means at the forward end of the arm adapted to cooperate with the clinching means when the arm is adjusted to rearward position on the base and to operate out of range of the clinching means when the arm is adjusted forwardly on the base to locate the staple-driving means beyond the forward end of the base.

4. A fastener-applying implement comprising a base, clinching means on the base, an arm, staple-driving means on the arm, and means for pivoting the arm above the base at different points spaced longitudinally thereof to locate the arm in one position with the staple-driving means in alinement with the clinching means to adapt it to drive and clinch staples in the work or to locate the arm in a different position with the staple-driving means beyond the forward end of the base and clear of the clinching means to adapt it to drive staples into the work without clinching the legs thereof.

5. A fastener-applying implement comprising a base, clinching means at the forward end of the base, a mounting at the rearward end of the base, an arm, staple-driving means on the arm, and means for pivoting the arm at different points on the mounting spaced longitudinally of the base to either aline the staple-driving means with the clinching means for cooperation therewith or to displace the staple-driving means beyond the forward end of the base to adapt it to operate out of range of the clinching means to drive staples with a tacking operation.

6. A fastener-applying implement comprising a base, clinching means at the forward end of the base, standards at the rearward end of the base provided with pivots, an arm formed with spaced pairs of bearings adapted to interchangeably engage the pivots on the standards, and staple-driving means at the forward end of the arm adapted to aline with the clinching means when the arm is adjusted with one pair of its bearings engaging the pivots on the standards and to position the stapling-driving means beyond the forward end of the base and out of range of the clinching means when the other pair of bearings is engaged with the pivots on the standards.

7. A fastener-applying implement comprising a base, clinching means at the forward end of the base, standards at the rearward end of the base formed with pivots projecting laterally therefrom, an arm formed with pairs of notches spaced at a distance apart to adapt them for interchangeable engagement with the pivots on the standards, and staple-driving means at the forward end of the arm adapted to cooperate with the clinching means when one pair of notches on the arm is engaged with the pivots on the standards and to locate the staple-driving means beyond the forward end of the base out of range of the clinching means when the other pair of notches on the arm is engaged with the pivots.

8. A fastener-applying implement comprising a base, clinching means on the base, a mounting on the base adjustable forwardly and rearwardly longitudinally thereof and connected to the base to rock relatively thereto, an arm, means for supporting the arm on the mounting, and staple-driving means on the arm adapted to cooperate with the clinching means when the mounting is adjusted to rearward position on the base, said staple-driving means on the arm being adjustable to a position beyond the forward end of the base and out of range of the clinching means when the mounting is moved to forward position on the base.

9. A fastener-applying implement comprising a base, clinching means at the forward end of the base, a mounting slidable forwardly and rearwardly longitudinally of the base, an arm supported on the mounting, and staple-driving means on the arm adapted to be adjusted in alinement with the clinching means to cooperate therewith or to be displaced beyond the forward end of the base to operate out of range of the clinching means by sliding the mounting on the base.

10. A fastener-applying implement comprising a base, clinching means at the forward end of the base, a mounting, means for slidably supporting the mounting on the base for adjustment longitudinally thereof while adapting it to rock on the base, on arm supported on said mounting, and staple-driving means at the forward end of the arm adapted to cooperate with the clinching means or to be displaced beyond the forward end of the base to operate out of range of the clinching means by sliding the mounting on the base.

11. A fastener-applying implement comprising a base formed with a pair of parallel slots extending longitudinally thereof, clinching means at the forward end of the base, a mounting comprising parallel standards slidable in the slots in the base, an arm mounted on said standards, and staple-driving means at the forward end of the arm adapted to be adjusted in alinement with the clinching means to cooperate therewith or to a position beyond the forward end of the base for operation out of range of said clinching means by sliding the standard in the slots on the base.

12. A fastener-applying implement comprising a base provided with clinching means at its forward end, a mounting at the rearward end of the base slidable longitudinally thereof, an arm supported on said mounting, staple-driving means at the forward end of the arm adapted to aline with the clinching means on the base when the mounting is adjusted in one position longitudinally of the base and to be displaced in advance of the forward end of the base beyond the range of the clinching means when the mounting is adjusted forwardly on the base, and means for retaining the arm in its different positions of adjustment.

ARTHUR H. MAYNARD.

REFERENCES CITED

The following references are of record in the file of this patent:

UNITED STATES PATENTS

| Number | Name | Date |
|---|---|---|
| 2,059,021 | Pankonin | Oct. 27, 1936 |
| 2,108,882 | Cavanagh | Feb. 22, 1938 |
| 2,378,725 | Paul | June 19, 1945 |